United States Patent
Foster

(10) Patent No.: US 6,470,781 B2
(45) Date of Patent: Oct. 29, 2002

(54) LIFTER BORE GROOVER TOOL

(76) Inventor: John Foster, HD 81, Box 3314, Searsmont, ME (US) 04973

( * ) Notice: Subject to any disclaimer, the term of this patent is extended or adjusted under 35 U.S.C. 154(b) by 126 days.

(21) Appl. No.: 09/728,730

(22) Filed: Dec. 1, 2000

(65) Prior Publication Data

US 2002/0067962 A1 Jun. 6, 2002

(51) Int. Cl.[7] .......................... B26D 03/06; B23D 21/14; B23D 05/00
(52) U.S. Cl. .............................. 83/875; 407/45; 83/180; 83/191; 144/137; 409/307
(58) Field of Search .............................. 407/66, 71, 73, 407/75, 76, 77, 85, 86, 87, 88, 92, 97, 101, 102; 82/113, 162, 165; 83/54, 180, 188, 191, 875; 409/297, 298, 299, 304, 307, 328, 337; 144/136.95, 137

(56) References Cited

U.S. PATENT DOCUMENTS ks4,164,381 A * 8/1979 Lovendahl .................. 408/181

* cited by examiner

*Primary Examiner*—A. L. Wellington
*Assistant Examiner*—Brian Walsh

(57) ABSTRACT

A lifter bore groover tool having a housing in an essentially rectilinear configuration which has an upper wall and a lower wall and a plurality of side walls. The side walls include a cutting wall and another wall and facing walls there between. A bore is formed in the housing adjacent to the cutting wall. A long cylindrical chamber beneath the bore is in communication with a guide slot extending through the cutting wall. A cylindrical cutting block is axially reciprocable within the long cylindrical chamber. A cutting tool is removably supported in the cutting block extending laterally through the guide slot for contacting the surface of the bore to be grooved. The cutting block and cutting tool are axially adjustable. A bolt is received within the bore. The bolt has an upper end with a head for rotation by the user. The bolt has a lower end rotatably coupled with respect to the cutting block whereby rotation of the bolt will axially shift the cutting block and tool to cut an axial groove in a bore upon rotation of the bolt by the user.

3 Claims, 3 Drawing Sheets

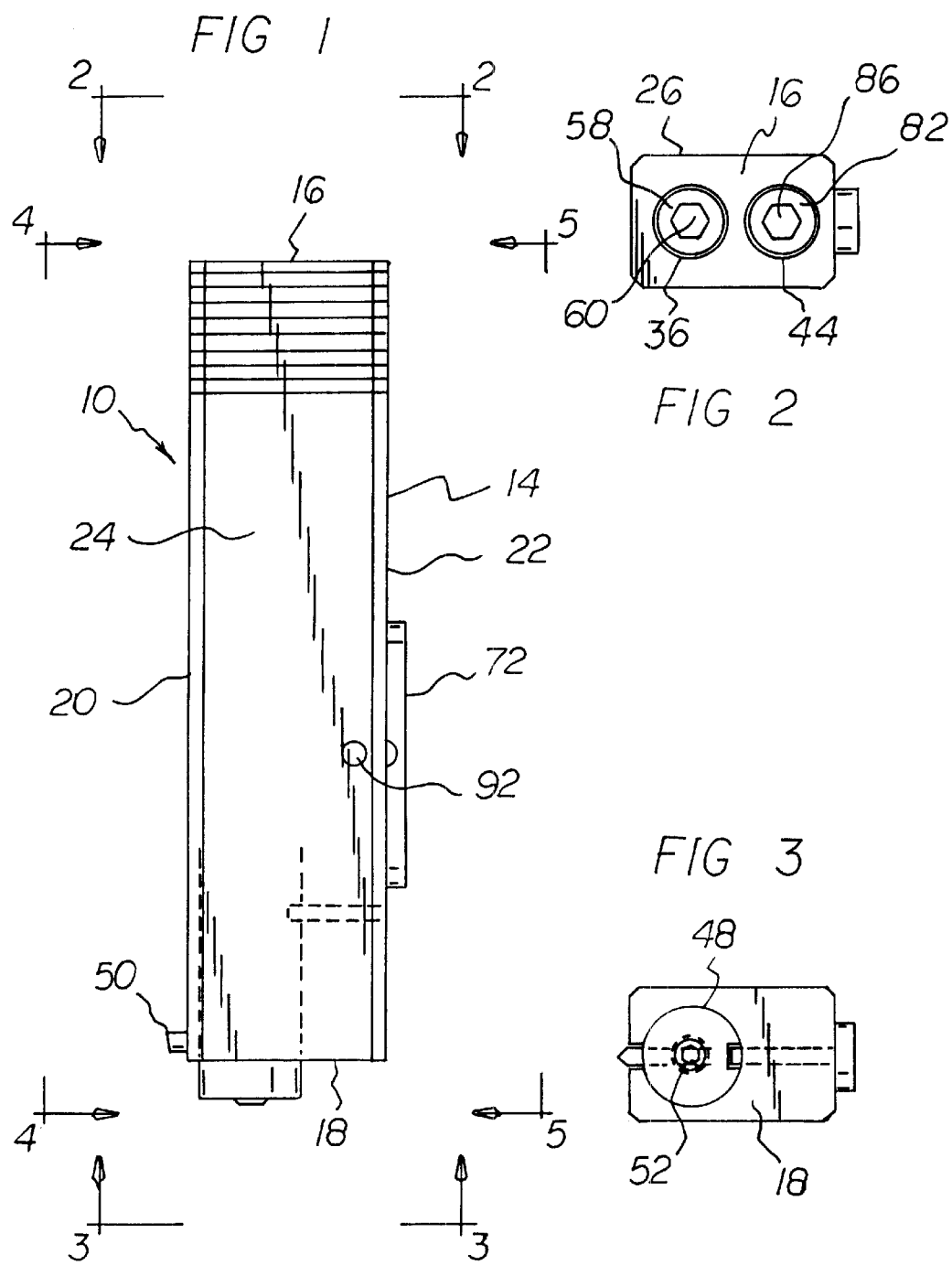

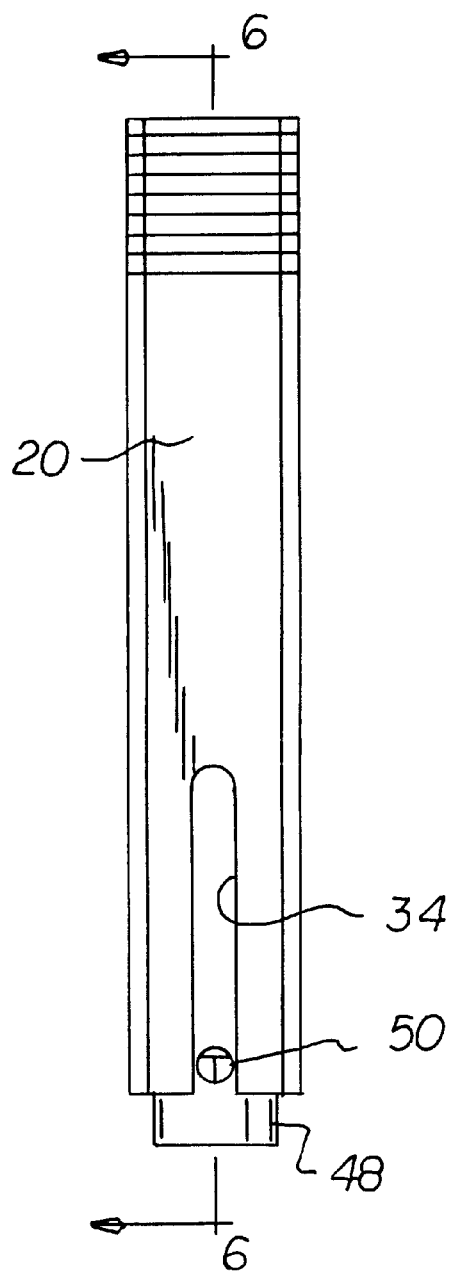
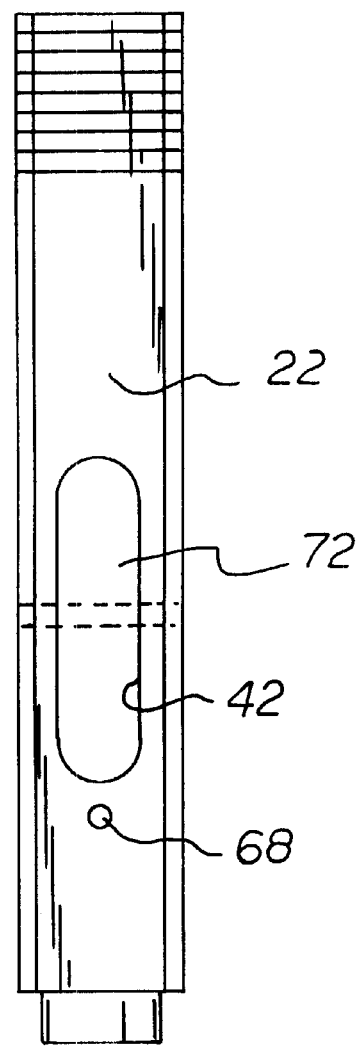

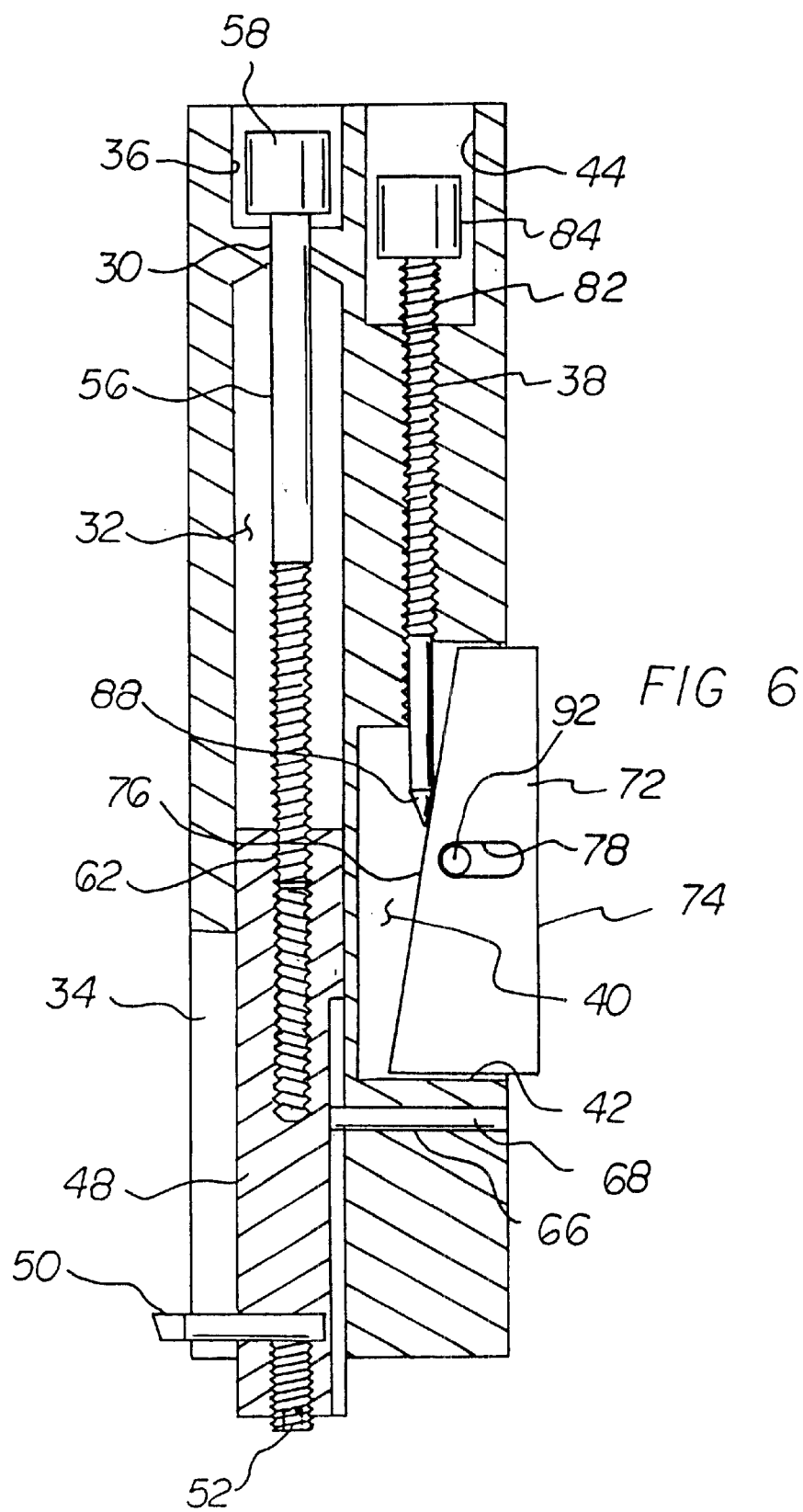

LIFTER BORE GROOVER TOOL

BACKGROUND OF THE INVENTION

1. Field of the Invention

The present invention relates to a lifter bore groover tool and more particularly pertains to precisely forming an axial groove in a cylindrical lifter bore.

2. Description of the Prior Art

The use of automotive tools of known designs and configurations is known in the prior art. More specifically, automotive tools of known designs and configurations previously devised and utilized for the purpose of reparing and maintaining vehicles by known methods and apparatuses are known to consist basically of familiar, expected, and obvious structural configurations, notwithstanding the myriad of designs encompassed by the crowded prior art which has been developed for the fulfillment of countless objectives and requirements.

The lifter bore groover tool according to the present invention substantially departs from the conventional concepts and designs of the prior art, and in doing so provides an apparatus primarily developed for the purpose of precisely forming an axial groove n a cylindrical lifter bore.

Therefore, it can be appreciated that there exists a continuing need for a new and improved lifter bore groover tool which can be used for precisely forming an axial groove in a cylindrical lifter bore. In this regard, the present invention substantially fulfills this need.

SUMMARY OF THE INVENTION

In view of the foregoing disadvantages inherent in the known types of automotive tools of known designs and configurations now present in the prior art, the present invention provides an improved lifter bore groover tool. As such, the general purpose of the present invention, which will be described subsequently in greater detail, is to provide a new and improved lifter bore groover tool and method which has all the advantages of the prior art and none of the disadvantages.

To attain this, the present invention essentially comprises a housing in an essentially rectilinear configuration with an upper wall and a lower wall. A plurality of side walls couple the upper and lower walls. The side walls include a thin cutting wall and a parallel thin adjusting wall. The side walls also include enlarged parallel facing walls coupling the thin walls. An unthreaded first bore is formed in the housing. The first bore has an axis parallel with the side wails and located adjacent to the cutting wall. A long cylindrical chamber is provided beneath the first bore. The chamber is in communication with a guide slot extending through the cutting wall upwardly from the bottom wall. A short cylindrical chamber is provided above the first bore. A threaded second bore is formed in the housing. The second bore has an axis parallel with the side walls and located adjacent to the adjusting wall. A lateral chamber is provided beneath the second bore located above the bottom wall extending through an opening in a central region of the adjusting wall. An intermediate cylindrical chamber is provided above the second bore. Next provided is a cylindrical cutting block. The cutting block is axially reciprocable within the long cylindrical chamber. A cutting tool is provided. The cutting tool is removably supported in the cutting block extending laterally through the guide slot for contacting the surface of the bore to be grooved. A set screw is provided for removably supporting the cutting tool within the cutting block. The cutting block and cutting tool are axially adjustable. A first bolt is provided. The first bolt is received within the first bore. The first bolt has an upper end with a head located within the short cylindrical chamber and an Allen head recess for rotation by the user. The first bolt has a lower end threadedly coupled with respect to the cutting block at its top whereby rotation of the first bolt will axially shift the cutting block and tool go cut an axial groove in a bore upon rotation of the first bolt by the user. An axial recess is formed in the cutting block on the side thereof remote from the cutting tool and guide slot. A guide pin is provided. The guide pin is positioned with the housing beneath the lateral chamber with an interior end located within the axial recess to preclude rotation of the cutting block and cutting tool during rotation of the first bolt. Next provided is an adjustment block. The adjustment block is located in the lateral chamber for lateral movement to enlarge and reduce the circumference of the tool after insertion into a bore. The adjustment block has a flat vertical exterior face for slidably contacting a bore during operation and use. The adjustment block also has a downwardly angled interior face. The adjustment block also has a laterally extending adjustment slot through the adjustment block between the interior and exterior surfaces. A second bolt is provided. The second bolt is threadedly received within the threaded second bore. The second bolt has an upper end with a head located within the intermediate cylindrical chamber and an Allen head recess for rotation by the user. The second bolt also has a lower end with a conical configuration in rotatable sliding contact with the angled interior face of the adjustment block whereby rotation of the second bolt will laterally shift the adjustment block within the lateral chamber upon rotation of the second bolt by the user. Lastly, a guide pin is provided. The guide pin is positioned within the housing spanning the adjustment chamber with an intermediate extent located within the adjustment slot to maintain the exterior face parallel with the adjustment face of the housing and the housing in a fixed orientation during operation and use.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled In the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lifter bore groover tool which has all of the advantages of the prior art automotive tools of known designs and configurations and none of the disadvantages.

It is another object of the present invention to provide a new and improved lifter bore groover tool which may be easily and efficiently manufactured and marketed.

It is further object of the present invention to provide a new and improved lifter bore groover tool which is of durable and reliable constructions.

An even further object of the present invention is to provide a new and improved lifter bore groover tool which is susceptible of a low cost of manufacture with regard to both materials and labor, and which accordingly is then susceptible of low prices of sale to the consuming public, thereby making such lifter bore groover tool economically available to the buying public.

Even still another object of the present invention is to provide a lifter bore groover tool for precisely forming an axial groove in a cylindrical lifter bore.

Lastly, it is an object of the present invention to provide a new and improved lifter bore groover tool. A housing in an essentially rectilinear configuration has an upper wall and a tower wall and a plurality of side walls. The side walls include a cutting wall and another wall and facing walls there between. A bore is formed in the housing adjacent to the cutting wall. A long cylindrical chamber beneath the bore is in communication with a guide slot extending through the cutting wall. A cylindrical cutting block is axially reciprocable within the long cylindrical chamber. A cutting tool is removably supported in the cutting block extending laterally through the guide slot for contacting the surface of the bore to be grooved. The cutting block and cutting tool are axially adjustable. A bolt as received within the bore. The bolt has an upper end with a head for rotation by the user. The bolt has a lower end rotatably coupled with respect to the cutting block whereby rotation of the bolt will axially shift the cutting block and tool to cut an axial groove in a bore upon rotation of the bolt by the user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of the (title) constructed in accordance with the principles of the present invention.

FIG. 2 is a top view of the tool taken along line 2—2 of FIG. 1.

FIG. 3 is a bottom view of the tool taken along line 3—3 of FIG. 1

FIG. 4 is a left side view of the tool taken along line 4—4 of FIG. 1.

FIG. 5 is a right side view of the tool taken along line 5—5 of FIG. 1.

FIG. 6 is a cross sectional view of the tool taken along line 6—6 of FIG. 4.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved lifter bore groover tool embodying the principles and concepts of the present invention and generally designated by the reference numeral 10 will be described.

The present invention, the lifter bore groover tool 10 is comprised of a plurality of components. Such components in their broadest context include a housing, a bore, a cylindrical cutting block and a bolt. Such components are individually configured and correlated with respect to each other so as to attain the desired objective.

A housing 14 is provided. The house is in an essentially rectilinear configuration with an upper wall 16 and a lower wall 18. A plurality of side walls couple the upper and lower walls. The side walls include a thin cutting wall 20 and a parallel thin adjusting wall 22. The side walls also include enlarged parallel facing walls 24, 26 coupling the thin walls.

An unthreaded first bore 30 is formed in the housing. The first bore has an axis parallel with the side walls and Located adjacent to the cutting wall. A long cylindrical chamber 32 is provided beneath the first bore. The chamber is in communication with a guide slot 34 extending through the cutting wall upwardly from the bottom wall. A short cylindrical chamber 36 is provided above the first bore.

A threaded second bore 38 is formed in the housing. The second bore has an axis parallel with the side walls and located adjacent to the adjusting wall. A lateral chamber 40 is provided beneath the second bore located above the bottom wall extending through an opening 42 in a central region of the adjusting wall. An intermediate cylindrical chamber 44 is provided above the second bore.

Next provided is a cylindrical cutting block 48. The cutting block is axially reciprocable within the long cylindrical chamber. A cutting tool 50 is provided. The cutting tool is removably supported in the cutting block extending laterally through the guide slot for contacting the surface of the bore to be grooved. A set screw 52 is provided for removably supporting the cutting tool within the cutting block. The cutting block and cutting tool are axially adjustable.

A first bolt 56 is provided. The first bolt is received within the first bore. The first bolt has an upper end with a head 58 located within the short cylindrical chamber and an Allen head recess 60 for rotation by the user. The first bolt has a lower end 62 threadedly coupled with respect to the cutting block at its top whereby rotation of the first bolt will axially shaft the cutting block and tool to cut an axial groove in a bore upon rotation of the first bolt by the user.

An axial recess 66 is formed in the cutting block on the side thereof remote from the cutting tool and guide slot. A guide pin 68 is provided. The guide pin is positioned with the housing beneath the lateral chamber with an interior end located within the axial recess to preclude rotation of the cutting block and cutting tool during rotation of the first bolt.

Next provided is an adjustment block 72. The adjustment block is located in the lateral chamber for lateral movement to enlarge and reduce the circumference of the tool after insertion into a bore. The adjustment block has a flat vertical exterior face 74 for slideably contacting a bore during operation and use. The adjustment block also has a downwardly angled interior face 76. The adjustment block also has a laterally extending adjustment slot 78 through the adjustment block between the interior and exterior surfaces.

A second bolt 82 is provided. The second bolt is threadedly received within the threaded second bore. The second bolt has an upper end with a head 84 located within the intermediate cylindrical chamber and an Allen head recess 86 for rotation by the user. The second bolt also has a lower end 88 with a conical configuration in rotatable sliding contact with the angled interior face of the adjustment block whereby rotation of the second bolt will laterally shift the adjustment block within the lateral chamber upon rotation of the second bolt by the user.

Lastly, a guide pin 92 is provided. The guide pin is positioned within the housing spanning the adjustment chamber with an intermediate extent located within the adjustment slot to maintain the exterior face parallel with the adjustment face of the housing and the housing in a fixed orientation during operation and use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lifter bore groover tool for precisely forming an axial groove in a cylindrical lifter bore comprising, in combination:

a housing in an essentially rectilinear configuration with an upper wall and a lower wall 18 and a plurality of side walls coupling the upper and lower walls, the side walls including a thin cutting wall and a parallel thin adjusting wall and with enlarged parallel facing walls coupling the thin walls;

an unthreaded first bore formed in the housing having an axis parallel with the side walls and located adjacent to the cutting wall with a long cylindrical chamber there beneath in communication with a guide slot extending through the cutting wall upwardly from the bottom wall and with a short cylindrical chamber there above;

a threaded second bore formed in the housing having an axis parallel with the side walls and located adjacent to the adjusting wall with a lateral chamber there beneath located above the bottom wall extending through an opening in a central region of the adjusting wall and with an intermediate cylindrical chamber there above;

a cylindrical cutting block axially reciprocable within the long cylindrical chamber with a cutting tool removably supported in the cutting block extending laterally through the guide slot adapted to contact a surface of a bore to be grooved, and with a set screw for removably supporting the cutting tool within the cutting block, the cutting block and cutting tool being axially adjustable;

a first bolt received within the first bore, the first bolt having an upper end with a head located within the short cylindrical chamber and an allen head recess for rotation by the user, the first bolt having a lower end threadedly coupled with respect to the cutting block at its top whereby rotation of the first bolt will axially shift the cutting block and tool to cut an axial groove in a bore upon rotation of the first bolt by the user;

an axial recess formed in the cutting block on a side thereof remote from the cutting tool and guide slot with a guide pin positioned with the housing beneath the lateral chamber with an interior end located within the axial recess to preclude rotation of the cutting block and cutting tool during rotation of the first bolt;

an adjustment block located in the lateral chamber for lateral movement to enlarge and reduce the circumference of the tool after insertion into a bore, the adjustment block having a flat vertical exterior face for slidably contacting a bore during operation and use and a downwardly angled interior face and a laterally extending adjustment slot through the adjustment block between interior and exterior surfaces;

a second bolt threadedly received within the threaded second bore, the second bolt having an upper end with a head located within the intermediate cylindrical chamber and an allen head recess for rotation by the user, the second bolt having a lower end with a conical configuration in rotatable sliding contact with the angled interior face of the adjustment block whereby rotation of the second bolt will laterally shift the adjustment block within the lateral chamber upon rotation of the second bolt by the user; and a guide pin positioned within the housing spanning the adjustment chamber with an intermediate extent located within the adjustment slot to maintain an exterior face parallel with the adjustment face of the housing and the housing in a fixed orientation during operation and use.

2. A lifter bore groover tool comprising:

a housing in an essentially rectilinear configuration with an upper wall and a lower wall and a plurality of side walls, the side walls including a cutting wall and another wall and with facing walls there between;

a bore formed in the housing adjacent to the cutting wall with a long cylindrical chamber there beneath in communication with a guide slot extending through the cutting wall;

a cylindrical cutting block axially reciprocable within the long cylindrical chamber with a cutting tool removably supported in the cutting block extending laterally through the guide slot for contacting a surface of a bore to be grooved, the cutting block and cutting too being axially adjustable; and a bolt received within the bore, the bolt having an upper end with a head for rotation by the user, the bolt having a lower end rotatably coupled with respect to the cutting block whereby rotation of the bolt will axially shift the cutting block and tool to cut an axial groove in a bore upon rotation of the bolt by the user.

3. A lifter bore groover tool comprising:

a housing in an essentially rectilinear configuration with an upper wall and a lower wall and a plurality of side walls, the side walls including an adjusting wall and an other wall and with facing walls there between;

a threaded bore formed in the housing located adjacent to the adjusting wall with a lateral chamber there beneath;

a cutting tool extending laterally from the housing for contacting a surface of a bore to be grooved;

an adjustment block located in the lateral chamber for lateral movement to enlarge and reduce the circumference of the tool after insertion into a bore, the adjustment block having a flat vertical exterior face for slidably contacting a bore and a downwardly angled interior;

a bolt threadedly received within the bore, the bolt having an upper end for rotation by the user, the bolt having a lower end with a conical configuration in contact with the angled interior face of the adjustment block whereby rotation of the bolt will laterally shift the adjustment block within the lateral chamber upon rotation of the bolt by the user.

* * * * *